Patented May 16, 1939

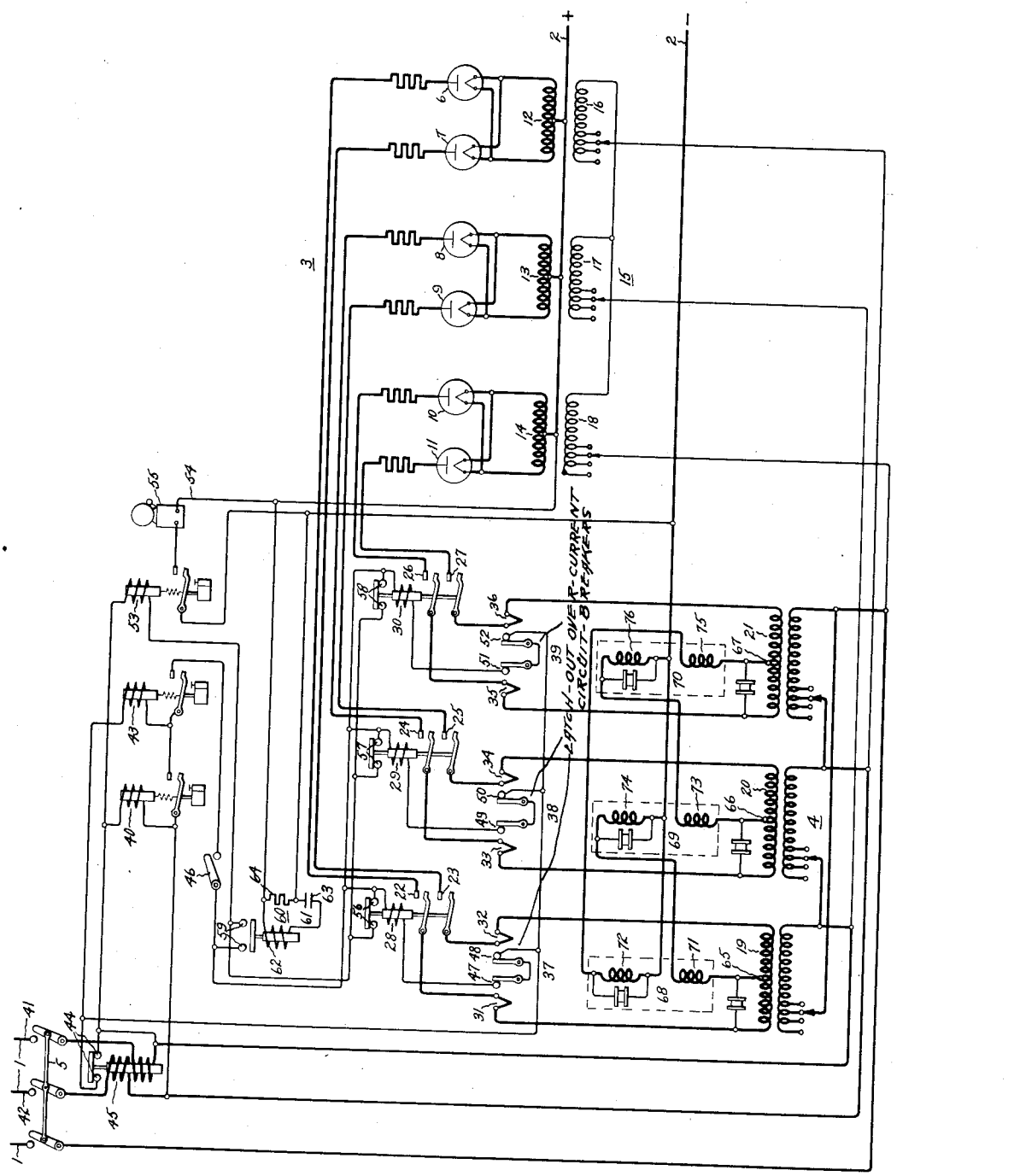

2,158,934

UNITED STATES PATENT OFFICE 2,158,934

PROTECTIVE MEANS FOR HOT-CATHODE RECTIFIERS

Rolland C. Griffith, Schenectady, N. Y., assignor to General Electric Company, a corporation of New York Application August 20, 1936, Serial No. 96,973

3 Claims. (Cl. 175—363)

My invention relates to rectifier systems, and particularly to rectifier systems for supplying direct-current power to loads such as elevators in buildings supplied, for example, only with alternating-current power or in which direct-current power has been replaced by alternating-current power. The object of the invention is to provide a rectifier system, for the supply of power to the above-mentioned and similar loads, so arranged that the required uninterrupted service is secured with a minimum of attention from the operator.

In certain localities, particularly in metropolitan districts, it has been the practice to supply direct-current power for the operation of motors, etc., elevators having commonly been operated from this direct-current power, but the tendency in the recent past has been to discontinue the supplying of direct-current power in these districts and to replace it with alternating-current power. In many instances when the direct-current power formerly supplying elevators has been thus discontinued current converting apparatus such as motor generators have been installed to supply the elevator motors from the alternating-current supply lines.

In order to avoid the use of rotating current converting apparatus, and for cost and other reasons, it has been suggested heretofore to employ, instead of the rotating apparatus, rectifier apparatus including arc discharge devices of the hot-cathode mercury-vapor type. Difficulties have been encountered, however, in the use of such rectifier apparatus for this purpose by reason of tube disablement such as arc backs, tube failure, or other causes necessitating an interruption of appreciable duration, during the operating periods of the elevators, of the supply of power to the elevator motors.

In accordance with my present invention these and other difficulties are overcome by the provision of a polyphase rectifier system including a plurality of hot-cathode mercury-vapor tubes, preferably a triple single-phase system, or system supplied from a three-phase line and having six tubes connected in pairs to the opposite terminals of the three secondary windings of the supply transformer, and protective means operatively associated with the input and output circuits of the system. The protective means include in accordance with the invention time-delay starting-relay means, direct-current circuit-contactor means, alternating-current circuit overload switch means, direct-current circuit thermo-relay means, unbalance relay means, and alarm circuit means, all so coordinated that upon closing of the alternating-current supply circuit the rectifier system continues to function automatically in normal operation if all tubes are transmitting their usual current.

If, however, upon closing of the alternating-current supply circuit or during normal operation of the system, one of the tubes arcs back and continues to arc back for a definite time interval, that pair of tubes which includes the tube in which the arc-back occurs is cut off to permit the system to continue operating on the remaining tubes and the alarm circuit functions to warn the operator of the abnormal condition. The thermo-relay means is so arranged that under this abnormal condition the operator is informed, upon inspection of the thermo-relay means, as to which one of the pair of tubes was arcing back and is thus enabled to remove this tube readily for replacement, at an opportune time, with a spare tube.

If, further, one of the tubes fails to transmit current or is disconnected the system continues to operate but, because of the unbalance in the system due to the failure of the tube, the alarm circuit is operated; the operator then determines which tube has failed by noting the absence of glow in this tube and is thereby enabled to remove and replace the faulty tube.

Preferably an interphase transformer means is provided comprising three separate interphase transformers interconnecting the main transformer secondaries and the direct-current circuit, the interphase transformer arrangement being such that if one tube of a pair is disconnected or becomes inoperative the other tube of the given pair is caused to continue to operate, thus further insuring the required uninterrupted supply of power to the elevator or other load.

My invention will be better understood from the following description when considered in connection with the accompanying drawing and its scope will be pointed out in the appended claims.

Referring to the drawing, the single figure thereof is a diagrammatic representation of an electric system including rectifier apparatus and protective means associated therewith, embodying my invention.

In the figure is shown an electric system which comprises an alternating-current circuit 1 which may be a commercial 3-phase power circuit, a direct-current circuit 2, and means to transfer power between the circuits 1 and 2 including a space discharge apparatus 3 adapted in the present embodiment of the invention to operate as a rectifier and for this purpose to be connected to the alternating-current circuit 1 through a main supply transformer 4 and a service switch 5. The space discharge apparatus 3 includes a plurality of discharge devices of the hot-cathode vapor-filled type arranged in pairs 6 and 7, 8 and 9, and 10 and 11. The cathodes of the pairs of tubes are connected to the secondaries 12, 13, 14 of a heating transformer 15, the primary phases 16, 17, 18 of which are adapted to be connected to alternating-current circuit 1 through service switch 5.

To protect the system and to insure continuity of operation thereof the pairs of tubes are adapted to be connected respectively to the secondaries 19, 20, 21 of main transformer 4 through corresponding pairs of contacts 22 and 23, 24 and 25, 26 and 27 of main pulsating-current contactors 28, 29, 30, in series with corresponding pairs of heater elements 31 and 32, 33 and 34, 35 and 36 of thermo-relays 37, 38, and 39. A time-delay relay 40 is adapted to be connected through service switch 5 to two phases, as 41 and 42, of alternating-current supply circuit 1. The relay 40 is arranged to energize a second time-delay relay 43 after a relatively long time interval, from two phases, as the phases 41 and 42, of circuit 1 through service switch 5 and the contacts 44 of an overload switch 45 in two phases of circuit 1. Relay 43 is adapted to energize, after a relatively short time interval, the pulsating-current contactors 28, 29, 30 from two phases, as the phases 41 and 42, of circuit 1, through service switch 5, a control switch 46, pairs of contacts 47 to 52 of thermo-relays 37 to 39 which are of the latch type, and the contacts 44 of overload switch 45, which is arranged to be responsive to abnormal current flow due to arc back in the tubes but not to be responsive to unbalance due to the failure of a tube or tubes to strike or fire, or to unbalance due to disconnection of a pair of tubes from the system.

Relay 43 is further adapted to energize an alarm relay 53 from two phases, as the phases 41 and 42 of circuit 1, through service switch 5 and contacts 56 to 58 of pulsating-current contactors 28 to 30 which are so arranged that contacts 56 to 58 are in closed position when the pairs of contacts 22 to 27 are open, and vice versa. Relay 53 may also be energized by relay 43 from the phases 41, 42 of circuit 1 as above described, but, instead of through the contacts 56 to 58 of pulsating-current contactors 28 to 30, through the contacts 59 of an unbalance relay 60 having a resonant circuit 61 including an inductance 62 and a capacitance 63 connected across the direct-current circuit 2, and a resistor 64 connected across the resonant circuit 61, the inductance 62 constituting the actuating coil for contacts 59. This unbalance relay is described and claimed in a copending application Serial No. 50,664, filed November 20, 1935, for "Protective circuits for space discharge apparatus", August Schmidt, Jr., which is assigned to the same assignee as the present application.

The neutral points 65, 66, 67 of main supply transformer secondaries 19, 20, 21 are preferably connected respectively to the negative side of direct-current circuit 2 through separate interphase transformers 68, 69, 70 including, respectively, pairs of coils 71 and 72, 73 and 74, and 75 and 76. Neutral point 65 is connected to circuit 2 through coil 71 of transformer 68 and coil 74 of transformer 69 in series, neutral point 66 is connected to circuit 2 through coil 73 of transformer 69 and coil 76 of transformer 70 in series, and neutral point 67 is connected to circuit 2 through coil 75 of transformer 70 and coil 72 of transformer 68 in series. The coils are arranged in a manner to produce in each interphase transformer, neutralization of the fluxes tending to be produced by the direct-current component of the rectified current and partially to aid the fluxes produced by the alternating component of the rectified current.

In operation of the rectifier system shown in the drawing, upon closing of the service switch 5 of alternating-current supply circuit 1, cathode heating current is supplied to the tubes 6 to 11 from circuit 1 through heating transformer 15 and at the same instant the time-delay relay 40 is energized from two phases 41, 42 of circuit 1. After a time interval sufficient to permit the cathods to heat to the temperature proper for safe operation of the tubes, for example 15 minutes, relay 40 operates to energize time-delay relay 43 which in turn, after a relatively short time interval, two seconds for example, energizes pulsating-current contactors 28 to 30, control switch 46 being assumed to be in its closed position. The contacts 56 to 58 thereupon open and the contacts 22 and 23, 24 and 25, and 26 and 27 close thereby connecting the anodes of the pairs of tubes 6 and 7, 8 and 9, 10 and 11, respectively, to the secondaries 19, 20 and 21 of main supply transformer 4. The system is now in condition to supply rectified current from alternating-current supply circuit 1 to direct-current load circuit 2.

In case, however, one of the tubes, as tube 6, arcs back, the overload switch 45 operates to open its contacts 44. Time-delay relay 40 being energized directly from two phases 41, 42 of circuit 1 remains closed, but time-delay relay 43, energized through contacts 44 of switch 45, now opens, thereby causing pulsating-current contactors 28 to 30 to open the anode circuits. The contacts 44 of overload switch 45 immediately reclose, thereby again energizing time-delay relay 43. After the predetermined short time interval, for example two seconds, the relay 43 again energizes the pulsating-current contactors 28 to 30 which thereupon again close the anode circuits. If the arc back does not disappear this operation of opening and reclosing the pulsating-current contactors 28 to 30 is repeated several times. If the arc back persists, that one of the thermo-relays 37 to 39 associated with the circuit or the tube which is arcing back, in the assumed case this being thermo-relay 37 associated with the pair of tubes including tube 6, operates to trip the associated pulsating-current contactor 28, that one of the contacts of relay 37, in the present case contact 47, which corresponds to the tube which is arcing back, remaining in the latched out position. The tube which has been arcing back being now out of circuit, the overload switch 45 recloses thereby causing time-delay relay 43 to energize the remaining pulsating-current contactors 29 and 30 which then operate to close contacts 24, 25 and 26, 27 in the anode circuits of the remaining pairs of tubes 8, 9 and 10, 11. Power is now supplied to direct-current circuit 2 through the four tubes 8 to 11 only. When the given tube 6 is thus taken out of service by the tripping of pulsating-current contactor 28, the contacts 56 of this contactor remain in closed position. The alarm relay 53 is therefore energized to close the alarm circuit 54 and thereby to operate the signal device 55.

After the preliminary closing of service switch 5 and the starting of the system for normal operation, one of the tubes, instead of arcing back, may fail to conduct current normally. In this latter case the overload switch 45, not being responsive to the resulting unbalance, does not open and the anode circuits of all of the tubes remain closed through the direct-current contactors 28 to 30. Since, however, one of the tubes is not conducting current normally, low frequency components are introduced into the direct-current load circuit 2. These components, which are the fundamental or normal frequency of the system and harmonics of the fundamental, are considerably lower than the normal ripple frequency in circuit 2. The circuit 61 of unbalance relay 60 is tuned to the fundamental or to one of the harmonics lower than the normal ripple frequency of circuit 2, or may be broadly tuned to respond both to the fundamental and to these harmonics. Relay 60 therefore operates, in the manner described in the above-mentioned application Serial No. 50,664, to close its contacts 59 thereby to energize alarm relay 53 which in turn closes alarm circuit 54 to operate the signal device 55.

In either of the above cases of the actuation of the signal device 55, the operator is warned of the presence of a faulty tube. This tube should be replaced by a spare tube as soon as the replacement can conveniently be made without impairment of continuity of service, since the rectifier system is, under these conditions, operating with less than all of its tubes delivering power.

When the operator proceeds to the making of a tube replacement after being advised of the advisability of this replacement by the alarm device 55, he first observes the pulsating-current contactors 28, 29, 30. If one of the contactors, for example 28, is found to be in open position the operator is thereby assured that one of the tubes has been arcing back. After opening the service switch 5 he next observes the corresponding thermo-relay 37 which includes the pair of contacts 47 and 48 which are normally closed to prevent openings of the pulsating-current contactor, but either of which may operate and remain latched out, due to overload current in the corresponding heater 31 or 32, to open the contactor and hold it open. In the present assumed case the operator will find that the contact 47 has been opened and he will then know that it was the corresponding tube 6 which was arcing back and which should be replaced.

If, however, after being warned by the signal device 55 the operator finds that none of the contactors 28 to 30 is in the open position he is thereby assured that none of the tubes was arcing back but that one of them was not operating normally, the signal device 55 having been brought into operation by the unbalance relay 60. In this case with the rectifier supplying power to the load, five of the tubes show a bluish-green glow, whereas one of the tubes is dark indicating a faulty tube which should be replaced after the service switch 5 is opened.

The interphase transformers 68 to 70 are so arranged that in addition to their usual function of causing in normal operation of the system the overlapping of the direct-current waves supplied in succession by the tubes, they cause, in case one tube of a given pair becomes disconnected or inoperative, the other tube of the pair to continue to operate. If tube 6, for example, normally connected to operate from one outer terminal of supply transformer secondary 19, becomes disconnected or inoperative the other tube 7 of the pair tends to fail to fire. However, under this condition the fluxes produced in the interphase transformer 68 by the direct-current components of the rectified current, flowing in the opposed pairs of coils 71, 72, no longer cancel and the transformer 68 tends to saturate; at the same time, voltages are induced, by current flowing in others of the tubes, which assist the voltage impressed on tube 7 by the secondary 19, whereby the tube 7 is caused to fire and the load in circuit 2 is caused to be supplied by five of the tubes until such time as the inoperative tube 6 may be conveniently replaced.

In case both tubes of a pair of tubes, for example 6 and 7, fail to conduct current, no current flows in the series connected windings 71 and 74 but current continues to flow in the other series connected windings 73, 76 and 75, 72. Interphase transformers 68 and 69 therefore saturate. Interphase transformer 70, however, having both of its windings 75 and 76 still conducting current, remains unsaturated, and since windings 75 and 76 are respectively in circuit with the pairs of tubes 10, 11 and 8, 9 the latter interphase transformer 70 causes these remaining pairs of tubes to devide the current, thereby preventing the occurrence of high peak currents in the tubes under all conditions.

My invention has been described herein in a particular embodiment for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States, is:

1. The combination with a rectifier system including an alternating-current supply circuit and a plurality of hot-cathode vapor-filled discharge devices, of a plurality of contactor devices each having a winding and contacts actuated thereby to connect the anodes of said discharge devices to said circuit, an overload device having a winding responsive to overload in said supply circuit and contacts adapted to be actuated by said last-named winding, a time-delay relay having a winding and contacts adapted to be actuated thereby, a plurality of thermo-relays each having a heater element connected in series with contacts of the corresponding one of said contact devices and each having contacts adapted to be actuated by heat from said heater element, a circuit connected to said supply circuit and including said time-delay relay contacts, said contactor device windings, and said thermo-relay contacts, and a circuit connected to said supply circuit and including said overload device contacts and said time-delay relay winding, whereby upon occurrence of overload in said system said contactor devices are opened and closed at regular intervals while said overload continues and whereby in response to current in the particular discharge device producing the overload the contactor in the circuit of said particular discharge device, is opened and held open after a predetermined duration of said overload.

2. The combination with a rectifier system including an alternating-current supply circuit and a plurality of pairs of discharge devices, of a plurality of contactors each having a winding and a pair of contacts actuated thereby to connect the anodes of corresponding pairs of discharge devices to said circuit, an overload device having a winding responsive to overload in said system and contacts adapted to be actuated by said last-named winding, a time-delay relay having a winding and contacts adapted to be actuated thereby, a plurality of thermo-relays each having a pair of heater elements connected respectively in series with the pair of contacts of the corresponding contactor, each of said thermo-relays having a pair of contact elements adapted respectively to be actuated by heat from the corresponding heater elements, a circuit connected to said supply circuit and including said time-delay relay contacts, said contactor windings, and said thermo-relay contact elements, and a circuit connected to said supply circuit and including said overload device contacts and said time-delay relay winding, whereby upon occurrence of overload in said system said contactors are opened and closed at regular intervals while said overload continues and whereby in response to current in the particular discharge device producing the overload the contactor corresponding to that one of said pairs of devices including said particular discharge device is opened and held open after a predetermined duration of said overload and that one of said devices is indicated which caused the overload.

3. The combination with a rectifier system including an alternating-current supply circuit and a plurality of discharge devices subject to arc back, of a plurality of contactors to connect the anodes of said devices to said circuit, opening and closing means for said contactors, a time-delay relay having a winding and contacts adapted to be actuated thereby, a circuit including said relay contacts and said contactor opening and closing means, means to energize said winding in response to overload current in said system due to arc back in one of said devices whereby said contactors are opened and closed at regular intervals while said arc back continues, means responsive to current in the particular device which is arcing back to prevent reclosing of the contactor corresponding to said particular discharge device and to indicate which of said devices was arcing back, said last-named means including a plurality of thermo-relays each responsive to current in a different one of said discharge devices, an alarm circuit, and means to energize said alarm circuit when said relay tends to close said contactor and said closing is prevented, said last-named means comprising a circuit including the contacts of said relay, contact means actuated by said contactor, and means to open and close said alarm circuit.

ROLLAND C. GRIFFITH.